United States Patent
Osada et al.

(10) Patent No.: US 8,048,969 B2
(45) Date of Patent: Nov. 1, 2011

(54) SEMICONDUCTOR ENCAPSULATING EPOXY RESIN COMPOSITION AND SEMICONDUCTOR DEVICE

(75) Inventors: Shoichi Osada, Annaka (JP); Yasuo Kimura, Annaka (JP); Eiichi Asano, Annaka (JP); Toshio Shiobara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 392 days.

(21) Appl. No.: 11/408,955

(22) Filed: Apr. 24, 2006

(65) Prior Publication Data

US 2006/0241250 A1    Oct. 26, 2006

(30) Foreign Application Priority Data

Apr. 25, 2005   (JP) .................................. 2005-125950

(51) Int. Cl.
 C08F 283/00  (2006.01)
 B32B 27/38   (2006.01)
 C08G 59/50   (2006.01)
(52) U.S. Cl. .................. 525/481; 428/413; 523/400
(58) Field of Classification Search .................. 525/481; 428/413; 523/400
See application file for complete search history.

(56) References Cited

U.S. PATENT DOCUMENTS

| | | | | |
|---|---|---|---|---|
| 5,302,672 A * | 4/1994 | Ogura et al. | ................. | 525/481 |
| 5,418,266 A * | 5/1995 | Shiobara et al. | ............. | 523/443 |
| 6,783,859 B2 * | 8/2004 | Osada et al. | .................. | 428/413 |
| 7,122,587 B2 * | 10/2006 | Shimoda et al. | ............. | 523/452 |
| 2003/0152777 A1 * | 8/2003 | Osada et al. | ................. | 428/413 |
| 2004/0006168 A1 * | 1/2004 | Wagner et al. | ............... | 524/405 |

FOREIGN PATENT DOCUMENTS

JP     3137202 B2    12/2000
JP     2005-015689 A  1/2005

* cited by examiner

*Primary Examiner* — Mark Eashoo
*Assistant Examiner* — Megan McCulley
(74) *Attorney, Agent, or Firm* — Birch, Stewart, Kolasch & Birch, LLP

(57) ABSTRACT

An epoxy resin composition comprising (A) a naphthalene type epoxy resin in which 35-85 parts by weight of 1,1-bis(2-glycidyloxy-1-naphthyl)alkane and 1-35 parts by weight of 1,1-bis(2,7-diglycidyloxy-1-naphthyl)alkane are included per 100 parts by weight of the resin, (B) a curing agent in the form of a naphthalene type phenolic resin, (C) an inorganic filler, and (D) a phosphazene compound is best suited for semiconductor encapsulation because it has good flow, a low coefficient of linear expansion, a high Tg, minimal moisture absorption, and crack resistance upon lead-free soldering.

6 Claims, 1 Drawing Sheet

SEMICONDUCTOR ENCAPSULATING EPOXY RESIN COMPOSITION AND SEMICONDUCTOR DEVICE

CROSS-REFERENCE TO RELATED APPLICATION

This non-provisional application claims priority under 35 U.S.C. §119(a) on Patent Application No. 2005-125950 filed in Japan on Apr. 25, 2005, the entire contents of which are hereby incorporated by reference.

This invention relates to an epoxy resin composition for semiconductor encapsulation which has good flow, a low coefficient of linear expansion, a high glass transition temperature, minimal moisture absorption, crack resistance upon lead-free soldering, flame retardance, and moisture-proof reliability. It also relates to a semiconductor device encapsulated with a cured product of the composition.

BACKGROUND ART

The current mainstream of semiconductor devices including diodes, transistors, ICs, LSIs and VLSIs are of the resin encapsulation type. Epoxy resins have superior moldability, adhesion, electrical properties, mechanical properties, and moisture resistance to other thermosetting resins. It is thus a common practice to encapsulate semiconductor devices with epoxy resin compositions. In harmony with the recent market trend of electronic equipment toward smaller size, lighter weight and higher performance, efforts are devoted to the fabrication of semiconductor members of larger integration and the promotion of semiconductor mount technology. Under the circumstances, more stringent requirements including lead elimination from solder are imposed on epoxy resins as the semiconductor encapsulant.

Recently, ball grid array (BGA) and QFN packages characterized by a high density mount become the mainstream of IC and LSI packages. For these packages which are encapsulated only on one surface, the problem of warpage after molding becomes more serious. One approach taken in the prior art for improving warpage is to increase the crosslink density of resins to elevate their glass transition temperature. While lead-free solders require higher soldering temperature, such resins have a higher modulus at higher temperature and high moisture absorption. Thus there are left outstanding problems of delamination at the interface between the cured epoxy resin and the substrate and at the interface between the semiconductor chip and the resin paste after solder reflow. On the other hand, for resins with a lower crosslink density, more inorganic filler loadings are effective for providing low water absorption, a low coefficient of expansion and a low modulus at high temperature and expected to be effective for imparting reflow resistance as well. Regrettably, a concomitant increase of viscosity can compromise the flow during molding.

Japanese Patent No. 3,137,202 discloses an epoxy resin composition comprising an epoxy resin and a curing agent wherein the epoxy resin used is 1,1-bis(2,7-diglycidyloxy-1-naphthyl)alkane. This epoxy resin composition in the cured state has good heat resistance and excellent moisture resistance, and overcomes the drawback that cured products of ordinary high-temperature epoxy resin compositions are hard and brittle.

JP-A 2005-15689 describes an epoxy resin composition comprising (A) an epoxy resin comprising (a1) 1,1-bis(2,7-diglycidyloxy-1-naphthyl)alkane, (a2) 1-(2,7-diglycidyloxy-1-naphthyl)-1-(2-glycidyloxy-1-naphthyl)alkane, and (a3) 1,1-bis(2-glycidyloxy-1-naphthyl)alkane, and (B) a curing agent wherein 40 to 95 parts by weight of (a3) is included per 100 parts by weight of (a1), (a2) and (a3) combined. It is described that inclusion of 40 to 95 parts by weight of the resin of formula (i), shown below, wherein m=n=0 is preferred from the standpoints of flow and curability.

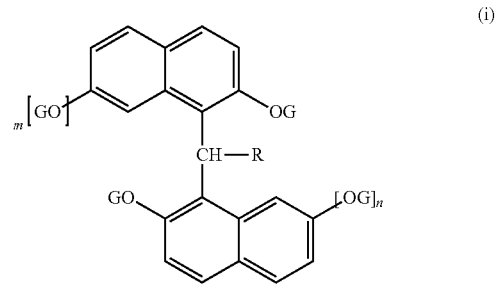

wherein m and n are 0 or 1, R is hydrogen, $C_1$-$C_4$ alkyl or phenyl, and G is a glycidyl-containing organic group.

DISCLOSURE OF THE INVENTION

An object of the present invention is to provide an epoxy resin composition which has good flow, a low coefficient of linear expansion, a high glass transition temperature, minimal moisture absorption, crack resistance on lead-free soldering, flame retardance, and moisture-proof reliability. Another object is to provide a semiconductor device encapsulated with the epoxy resin composition in the cured state.

The inventor has found that by combining a specific epoxy resin of the general formula (1), shown below, with a specific phenolic resin, especially of the general formula (3), shown below, there is obtained an epoxy resin composition which is fully flowable and cures into parts having a low coefficient of linear expansion, a high glass transition temperature (Tg), and minimal moisture absorption, and that by further adding a phosphazene compound of the compositional formula (2), shown below, the composition is improved in flame retardance and moisture-proof reliability without a need for brominated epoxy resins and antimony trioxide. The composition is thus suited for semiconductor encapsulation.

Accordingly, the present invention provides an epoxy resin composition comprising (A) a naphthalene type epoxy resin having the general formula (1):

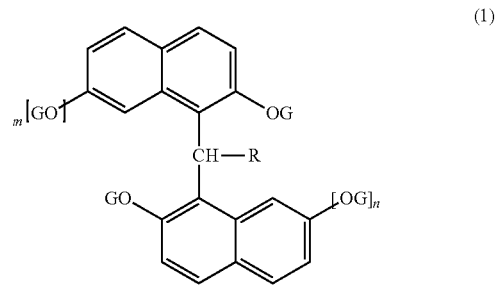

wherein m and n are 0 or 1, R is hydrogen, $C_1$-$C_4$ alkyl or phenyl, and G is a glycidyl-containing organic group, with the proviso that 35 to 85 parts by weight of the resin wherein m=0 and n=0 and 1 to 35 parts by weight of the resin wherein m=1 and n=1 are included per 100 parts by weight of the resin of formula (1), (B) a phenolic resin curing agent having at least one substituted or unsubstituted naphthalene ring in a molecule, (C) an inorganic filler, and
(D) a phosphazene compound having the average compositional formula (2):

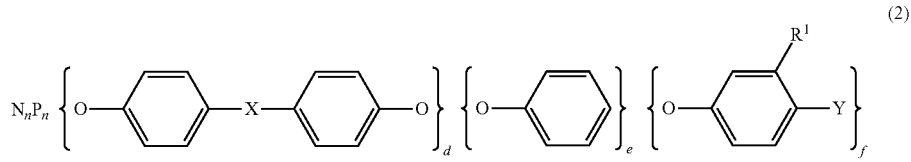

wherein X is a single bond or a group selected from among $CH_2$, $C(CH_3)_2$, $SO_2$, S, O, and $O(CO)O$; Y is OH, SH or $NH_2$; $R^1$ is a group selected from among $C_1$-$C_4$ alkyl and alkoxy, $NH_2$, $NR^2R^3$, and $SR^4$; $R^2$, $R^3$ and $R^4$ each are hydrogen or $C_1$-$C_4$ alkyl; d, e, f and n are numbers satisfying $0 \leq d \leq 0.25n$, $0 \leq e \leq 2n$, $0 \leq f \leq 2n$, $2d+e+f=2n$, and $3 \leq n \leq 1,000$.

In a preferred embodiment, the phenolic resin (B) comprises a phenolic resin having the general formula (3):

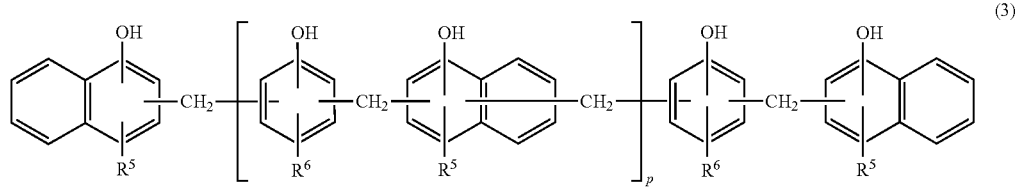

wherein $R^5$ and $R^6$ are each independently hydrogen, $C_1$-$C_4$ alkyl or aryl, and p is an integer of 0 to 10.

Also contemplated herein is a semiconductor device encapsulated with a cured product of the epoxy resin composition. In a preferred embodiment, the semiconductor device comprises a resin substrate or a metal substrate, and a semiconductor member mounted on one surface of the resin substrate or one surface of the metal substrate, wherein the semiconductor member is encapsulated with the epoxy resin composition substantially solely on the one surface of the resin or metal substrate.

BENEFITS OF THE INVENTION

The epoxy resin composition of the invention is fully flowable and cures into parts having a low coefficient of linear expansion, a high Tg, minimal moisture absorption, and crack resistance as well as flame retardance and moisture-proof reliability. It is best suited for semiconductor encapsulation. The semiconductor device encapsulated with a cured product of the epoxy resin composition is of great worth in the industry.

DESCRIPTION OF THE PREFERRED EMBODIMENTS

Figure 1:
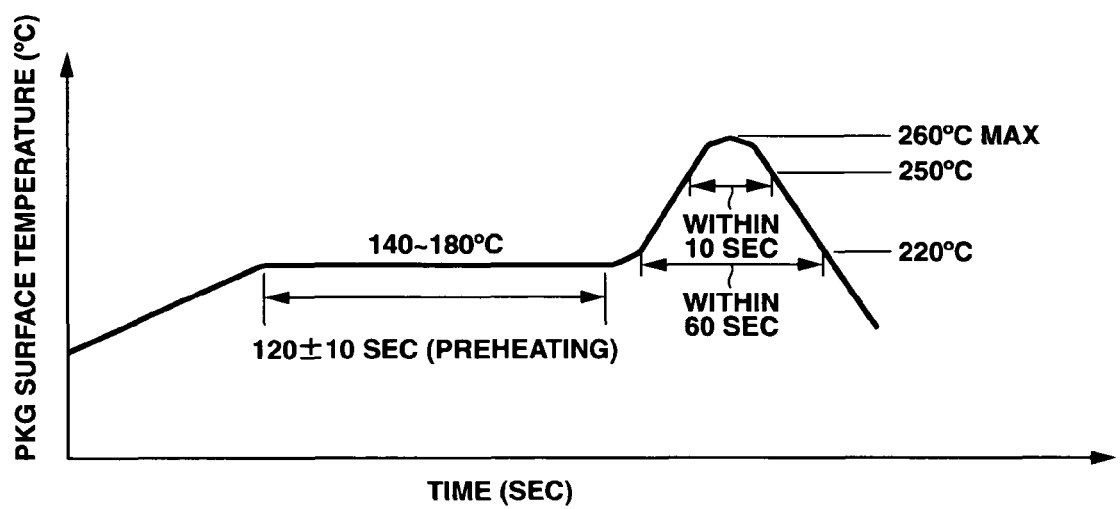
FIG. 1 is a diagrammatic representation of the IR reflow schedule for reflow resistance measurement.

The epoxy resin composition of the invention for semiconductor encapsulation comprises (A) an epoxy resin, (B) a phenolic resin curing agent, (C) an inorganic filler, and (D) a phosphazene compound.

A. Epoxy Resin

The epoxy resin (A) comprises a naphthalene type epoxy resin having the general formula (1). It is essential that 35 to

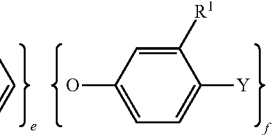

85 parts by weight of the resin wherein m=0 and n=0 and 1 to 35 parts by weight of the resin wherein m=1 and n=1 be present per 100 parts by weight of the resin of formula (1).

If the resin wherein m=0 and n=0 is less than 35 parts by weight per 100 parts by weight of the resin of formula (1), the resin composition has a high viscosity and is less flowable. If the same resin is more than 85 parts by weight, the resin composition undesirably has an extremely low crosslinking density, less curability and a low Tg. If the resin wherein m=1 and n=1 is more than 35 parts by weight per 100 parts by weight of the resin of formula (1), the resin composition has an increased crosslinking density and an increased Tg, but is undesirably increased in modulus of elasticity at high temperature. In order that the epoxy resin composition have satisfactory curability, heat resistance and modulus of elasticity at high temperature, it is preferred that the content of the resin wherein m=0 and n=0 be 45 to 70 parts by weight and the content of the resin wherein m=1 and n=1 be 5 to 30 parts by weight.

It is described in JP-A 2005-15689 that inclusion of 40 to 95 parts by weight of the resin of formula (1) wherein m=n=0 is preferred from the standpoints of flow and curability. It has been found that the epoxy resin (A) used herein having the same naphthalene structure of formula (1) exhibits good flow, a low coefficient of linear expansion, a high Tg, minimal moisture absorption, and soldering crack resistance when the content of the resin of formula (1) wherein m=1 and n=1 is also limited to a certain range.

Specific examples of these epoxy resins are shown below.

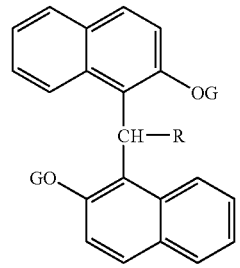

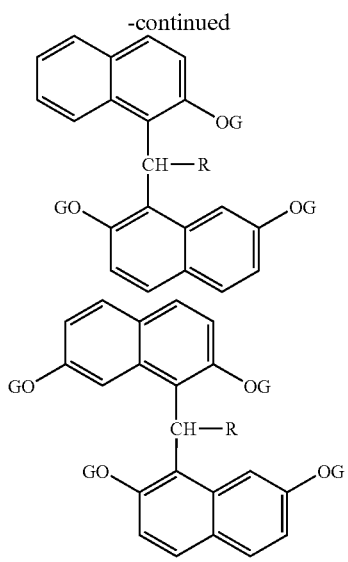

Note that R and G are as defined above.

Illustrative examples of R include hydrogen atoms, alkyl groups such as methyl, ethyl and propyl, and phenyl groups. One typical example of the glycidyl-containing organic group of G is shown below.

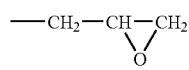

In the inventive composition, another epoxy resin may be used in combination with the naphthalene epoxy resin having formula (1) as the epoxy resin component. The other epoxy resin used herein is not critical and is selected from prior art well-known epoxy resins including novolac type epoxy resins (e.g., phenol novolac epoxy resins, cresol novolac epoxy resins), triphenolalkane type epoxy resins (e.g., triphenolmethane epoxy resins, triphenolpropane epoxy resins), biphenyl type epoxy resins, phenol aralkyl type epoxy resins, biphenyl aralkyl type epoxy resins, heterocyclic epoxy resins, naphthalene ring-containing epoxy resins other than formula (1), bisphenol type epoxy resins (e.g., bisphenol A epoxy resins, bisphenol F epoxy resins), stilbene type epoxy resins, and halogenated epoxy resins. The other epoxy resins may be employed alone or in combination of two or more.

It is desired that the naphthalene epoxy resin having formula (1) account for 50 to 100% by weight, more preferably 70 to 100% by weight of the entire epoxy resin component (i.e., naphthalene epoxy resin of formula (1)+other epoxy resins). If the proportion of the naphthalene epoxy resin is less than 50% by weight, some of the desired properties including heat resistance, reflow resistance and moisture absorption may be lost.

B. Curing Agent

A phenolic resin is included in the epoxy resin composition of the invention as a curing agent for the epoxy resin (A). It is a phenolic resin having at least one substituted or unsubstituted naphthalene ring in a molecule. Preferred are phenolic resins having the general formula (3):

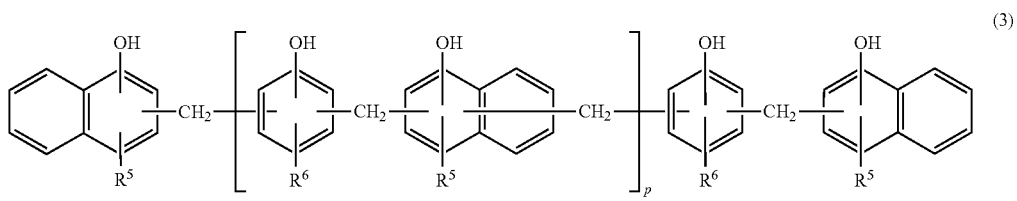

wherein $R^5$ and $R^6$ are each independently hydrogen, $C_1$-$C_4$ alkyl or aryl, and p is an integer of 0 to 10.

Illustrative examples of $R^1$ and $R^2$ include hydrogen atoms, alkyl groups such as methyl, ethyl and propyl, and phenyl.

The use of a curing agent in the form of a naphthalene ring-bearing phenolic resin ensures that the epoxy resin composition in the cured state has a low coefficient of linear expansion, a high Tg, a low modulus of elasticity in a temperature range equal to or above Tg, and minimal water absorption. When the epoxy resin composition is used as an encapsulant for semiconductor devices, the resulting package is improved in crack resistance upon thermal shocks and in warpage. Illustrative examples of the naphthalene ring-bearing phenolic resin having formula (3) include the following compounds (4) to (7).

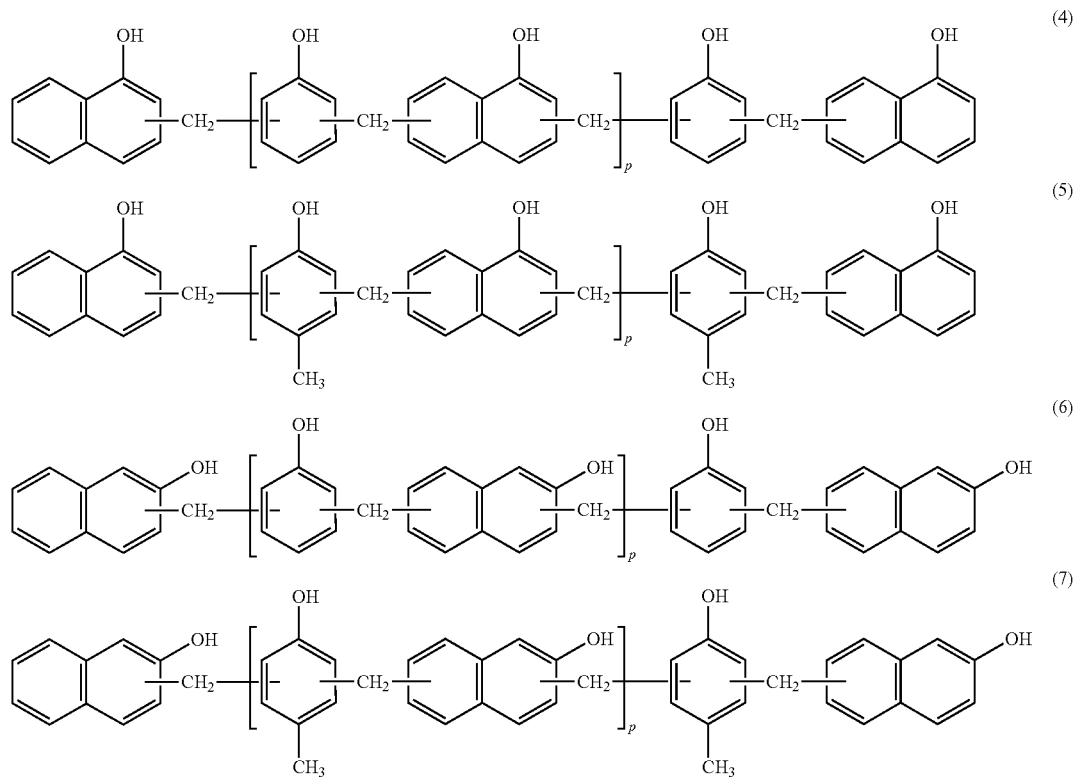

As the phenolic resin (B) in the epoxy resin composition of the invention, another phenolic resin may be used in combination with the specific phenolic resin of formula (3). The other phenolic resin is not particularly limited, and use may be made of prior art well-known phenolic resins including novolac type phenolic resins (e.g., phenol novolac resins, cresol novolac resins), phenol aralkyl type phenolic resins, biphenyl aralkyl type phenolic resins, biphenyl type phenolic resins, triphenolalkane type phenolic resins (e.g., triphenolmethane phenolic resins, triphenolpropane phenolic resins), alicyclic phenolic resins, heterocyclic phenolic resins, and bisphenol type phenolic resins (e.g., bisphenol A and bisphenol F phenolic resins). These phenolic resins may be employed alone or in combination of two or more.

It is desired that the naphthalene phenolic resin account for 25 to 100% by weight, more preferably 40 to 80% by weight of the entire phenolic resin component (i.e., naphthalene phenolic resin+other phenolic resins). If the proportion of the naphthalene phenolic resin is less than 25% by weight, some of the desired properties including heat resistance, moisture absorption and warpage may be lost.

No particular limit is imposed on the proportion of phenolic resin (B) relative to epoxy resin (A). The phenolic resin is preferably used in such amounts that the molar ratio of phenolic hydroxyl groups in the curing agent to epoxy groups in the epoxy resin is from 0.5 to 1.5, and more preferably from 0.8 to 1.2.

C. Inorganic Filler

The inorganic filler (C) included in the epoxy resin compositions of the invention may be any suitable inorganic filler commonly used in epoxy resin compositions. Illustrative examples include silicas such as fused silica and crystalline silica, alumina, silicon nitride, aluminum nitride, boron nitride, titanium oxide, glass fibers, and antimony trioxide.

No particular limit is imposed on the average particle size and shape of these inorganic fillers as well as the amount thereof. To enhance the crack resistance upon lead-free soldering and flame retardance, the inorganic filler is preferably contained in a larger amount in the epoxy resin composition insofar as this does not compromise moldability.

With respect to the mean particle size and shape of the inorganic filler, spherical fused silica having a mean particle size of 3 to 30 μm, especially 5 to 25 μm is more preferred. It is noted that the mean particle size can be determined as the weight average value or median diameter in particle size distribution measurement by the laser light diffraction technique, for example.

The amount of the inorganic filler (C) loaded is preferably 200 to 1,100 parts, more preferably 500 to 800 parts by weight per 100 parts by weight of the epoxy resin (A) and curing agent (B) combined. A composition with less than 200 pbw of the inorganic filler may have an increased coefficient of expansion, allowing the packages to undergo more warpage so that more stresses may be applied to the semiconductor devices, detracting from the device performance. Additionally, the resin content relative to the entire composition becomes higher, detracting from moisture resistance and crack resistance. A composition with more than 1,100 pbw of the inorganic filler may have too high a viscosity to mold. The content of inorganic filler is preferably 75 to 91% by weight, more preferably 78 to 89% by weight, even more preferably 83 to 87% by weight based on the entire composition.

The inorganic filler used herein is preferably surface treated beforehand with a coupling agent such as a silane coupling agent or a titanate coupling agent in order to increase the bonding strength between the resin and the inorganic filler. The preferred coupling agents are silane coupling agents including epoxy silanes such as γ-glycidoxypropyltrimethoxysilane, γ-glycidoxypropylmethyldiethoxysilane, γ-isocyanatopropyltriethoxysilane, γ-ureidopropyltriethoxysilane, and β-(3,4-epoxycyclohexyl)ethyltrimethoxysilane; amino silanes such as N-(β-aminoethyl)-γ-aminopropyltrimethoxysilane, γ-aminopropyltriethoxysilane, and N-phenyl-γ-aminopropyltrimethoxysilane; mercapto silanes such as γ-mercaptopropyltrimethoxysilane; and reaction products of imidazole compounds with γ-glycidoxypropyltrimethoxysilane. These coupling agents may be used alone or in admixture. No particular limitation is imposed on the amount of coupling agent used for surface treatment or the method of surface treatment.

D. Phosphazene Compound

In the epoxy resin composition of the invention, (D) a phosphazene compound having the average compositional formula (2) is included. The resulting composition in the cured state is improved in hot water extraction and moisture-proof reliability over epoxy resin compositions loaded with phosphorus-based flame retardants such as red phosphorus and phosphate esters.

is depicted as

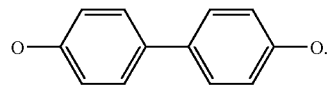

The amount of the phosphazene compound added is not particularly limited although it is preferably 1 to 50% by weight, more preferably 2 to 20% by weight based on the total weight of components (A) and (B). Less than 1 wt % of the phosphazene compound may fail to achieve the desired flame retardant effect whereas more than 50 wt % of the phosphazene compound may detract from fluidity.

Additives

In addition to the foregoing components (A) to (D), the encapsulating resin compositions of the invention may further include various additives, if necessary. Exemplary additives include cure accelerators such as imidazole compounds, tertiary amine compounds and phosphorus compounds; flame retardants such as molybdenum compounds (e.g., zinc

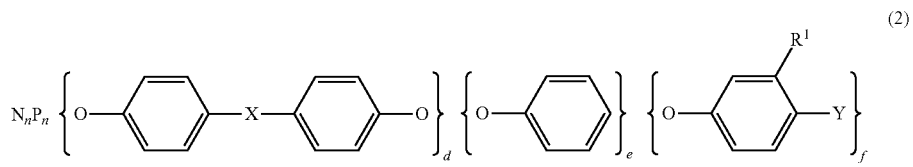

(2)

In formula (2), X is a single bond or a group selected from among $CH_2$, $C(CH_3)_2$, $SO_2$, S, O, and $O(CO)O$; Y is OH, SH or $NH_2$; $R^1$ is a group selected from among $C_1$-$C_4$ alkyl and alkoxy, $NH_2$, $NR^2R^3$, and $SR^4$; $R^2$, $R^3$ and $R^4$ each are hydrogen or $C_1$-$C_4$ alkyl; d, e, f and n are numbers satisfying $0 \leq d \leq 0.25n$, $0 \leq e \leq 2n$, $0 \leq f \leq 2n$, $2d+e+f=2n$, and $3 \leq n \leq 1,000$.

In formula (2), n is a number from 3 to 1,000, and preferably 3 to 10. For ease of synthesis, n=3 is most preferred.

The subscripts d, e and f are numbers satisfying $0 \leq d \leq 0.25n$, $0 \leq e \leq 2n$, $0 \leq f \leq 2n$, and $2d+e+f=2n$. If $0.25n<d$, then the phosphazene compound has a higher softening point due to many intermolecular crosslinks and is less compatible with the epoxy resin, failing to achieve the desired flame retardant effect. The preferred range of d is $0 \leq d \leq 0.15n$.

X, Y and $R^1$ are as defined above. Specifically, $R^1$ is an electron donative group. Absent an electron donative group, Y becomes less nucleophilic and thus less reactive with epoxy groups. This requires to add a more amount of the phosphazene compound of formula (2), which has negative impact on curability and electric resistance at high temperature. Less curable compositions, in turn, are more prone to thermal decomposition, indicating less flame retardance.

If the alkyl or alkoxy group represented by $R^1$ has equal to or more than 5 carbon atoms, flame retardance becomes poor. Desirably $R^1$ is methyl, methoxy, amino or dimethylamino group.

When X is a single bond, the moiety:

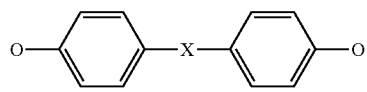

molybdate on zinc oxide, zinc molybdate on talc), hydroxides (e.g., magnesium hydroxide and aluminum hydroxide); stress reducing agents such as thermoplastic resins, thermoplastic elastomers, organic synthetic rubbers, and silicones; parting agents such as carnauba wax, polyethylene oxide and montanic acid esters; and coloring agents such as carbon black and Ketjen Black.

For promoting the cure reaction of the epoxy resin with the curing agent (phenolic resin), a cure accelerator is often used. The cure accelerator is not particularly limited as long as it can promote cure reaction. Useful cure accelerators include phosphorus compounds such as triphenylphosphine, tributylphosphine, tri(p-methylphenyl)phosphine, tri(nonylphenyl)phosphine, triphenylphosphine triphenylborane, tetraphenylphosphine tetraphenylborate and triphenylphosphine benzoquinone adduct; tertiary amine compounds such as triethylamine, benzyldimethylamine, α-methylbenzyldimethylamine, and 1,8-diazabicyclo[5.4.0]undecene-7; and imidazole compounds such as 2-methylimidazole, 2-phenylimidazole, and 2-phenyl-4-methylimidazole.

The cure accelerator may be used in an effective amount for promoting the cure reaction of the epoxy resin and curing agent. When the cure accelerator is a phosphorus compound, tertiary amine compound or imidazole compound, it is preferably used in amounts of 0.1 to 3 parts by weight, more preferably 0.5 to 2 parts by weight per 100 parts by weight of the epoxy resin and curing agent combined.

Parting agents which can be used herein include carnauba wax, rice wax, polyethylene, polyethylene oxide, montanic acid, and montan waxes in the form of esters of montanic acid with saturated alcohols, 2-(2-hydroxyethylamino)ethanol, ethylene glycol, glycerin or the like; stearic acid, stearic esters, stearamides, ethylene bisstearamide, ethylene-vinyl acetate copolymers, and the like, alone or in admixture of two or more. The parting agent is desirably included in an amount of 0.1 to 5 parts, more desirably 0.3 to 4 parts by weight per 100 parts by weight of components (A) and (B) combined.

When the components are mixed in a mixer or the like to form a uniform composition, it is preferred for improved shelf stability of the resulting composition to add a silane coupling agent as a wetter to carry out previous surface treatment.

Examples of suitable silane coupling agents include γ-glycidoxypropyltrimethoxysilane, γ-glycidoxypropylmethyldiethoxysilane, γ-glycidoxypropyltriethoxysilane, p-styryltrimethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane, γ-mercaptopropylmethyldimethoxysilane, γ-mercaptopropyltrimethoxysilane, bis(triethoxypropyl)tetrasulfide, and γ-isocyanatopropyltriethoxysilane. No particular limits are imposed on the amount of silane coupling agent used for surface treatment and the surface treating procedure.

Preparation

The inventive epoxy resin compositions may be prepared as a molding material by compounding components (A) to (D) and optional additives in predetermined proportions, intimately mixing these components together in a mixer or the like, then melting and working the resulting mixture in a hot roll mill, kneader, extruder or the like. The mixture is then cooled and solidified, and subsequently ground to a suitable size so as to give a molding material.

The resulting epoxy resin compositions of the invention can be effectively used for encapsulating various types of semiconductor devices. The encapsulation method most commonly used is low-pressure transfer molding. The epoxy resin composition of the invention is preferably molded and cured at a temperature of about 150 to 185° C. for a period of about 30 to 180 seconds, followed by post-curing at about 150 to 185° C. for about 2 to 20 hours.

In this case, the epoxy resin composition of the present invention is effectively used for a semiconductor device in which a semiconductor member is mounted on one surface of a resin substrate or a metal substrate to encapsulate the semiconductor member solely on the one surface of the resin or metal substrate. Therefore, the inventive epoxy resin composition is preferably used for the encapsulation of ball grid array (BGA) and QFN packages.

EXAMPLE

Examples and Comparative Examples are given below for further illustrating the invention, but are not intended to limit the invention. All parts are by weight.

Examples 1-6 & Comparative Examples 7-11

Epoxy resin compositions for semiconductor encapsulation were prepared by uniformly melt mixing the components shown in Table 2 in a hot twin-roll mill, followed by cooling and grinding. The components used are identified below.

Synthesis Example A

In a nitrogen atmosphere, 8.6 g (214 mmol) of sodium hydride was suspended in 50 ml of tetrahydrofuran (THF) at 0° C. To the suspension, 19.8 g (211 mmol) of phenol in 75 ml of THF was added dropwise, followed by 30 minutes of stirring. Further 12.0 g (34.5 mmol) of hexachlorotriphosphazene in 75 ml of THF was added dropwise, after which the solution was heated under reflux for 18 hours. The solvent was distilled off in vacuo, and methanol was added to the residue whereupon crystals precipitated. The crystals were washed with methanol and water, obtaining 23.8 g of white crystals. The product had the following formula.

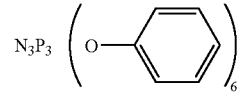

Synthesis Example B

In a nitrogen atmosphere, 4.6 g (114 mmol) of sodium hydride was suspended in 50 ml of THF at 0° C. To the suspension, a solution of 9.7 g (104 mmol) of phenol and 0.40 g (1.7 mmol) of 4,4'-sulfonyldiphenol in 50 ml of THF was added dropwise, followed by 30 minutes of stirring. Further 12.5 g (36.0 mmol) of hexachlorotriphosphazene in 50 ml of THF was added dropwise, after which the solution was heated under reflux for 5 hours. The solvent was distilled off in vacuo, 150 ml of cyclohexane and 57.3 g (345 mmol) of methylhydroquinone were added to the residue, and 27.3 g (345 mmol) of pyridine was added dropwise. The solution was heated under reflux for 18 hours. From the reaction mixture, the lower layer of yellow syrup was decanted. This was dissolved in 80 ml of 80% acetic acid and poured into 500 ml of water whereupon crystals precipitated. The crystals were dissolved in methanol and poured into water whereupon crystals formed again. This procedure was repeated until the water became neutral. There was obtained 25.8 g of brown crystals. The product had the following formula.

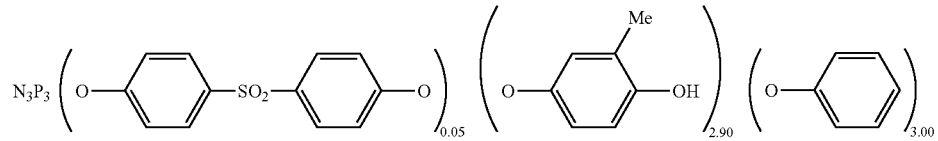

Epoxy Resin

Epoxy resins of formula (1) include epoxy resins (i) to (iii) of the following structures having different values of m and n. Epoxy resins (a) to (d) which are mixtures of epoxy resins (i), (ii) and (iii) blended in the proportion shown in Table 1 were used as well as an epoxy resin (e) which is a biphenyl aralkyl type epoxy resin NC3000 (Nippon Kayaku Co., Ltd.).

Note that G is

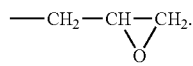

Epoxy resin (i) (m=0, n=0)

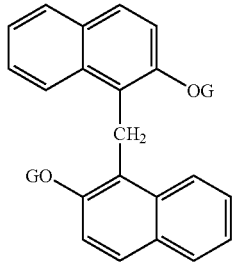

Epoxy resin (ii) (m=1, n=0, or m=0, n=1)

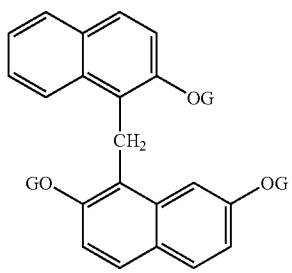

Epoxy resin (iii) (m=1, n=1)

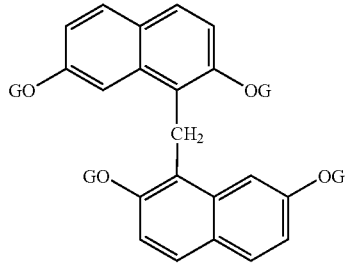

TABLE 1

| (% by weight) | Blending proportion | | |
|---|---|---|---|
| | Epoxy resin (i) | Epoxy resin (ii) | Epoxy resin (iii) |
| Epoxy resin (a) | 60 | 30 | 10 |
| Epoxy resin (b) | 50 | 35 | 15 |
| Epoxy resin (c) | 100 | 0 | 0 |
| Epoxy resin (d) | 50 | 0 | 50 |

Phenolic Resin

A phenolic resin (f) is a mixture having the following formula in which q is 0 to 10.

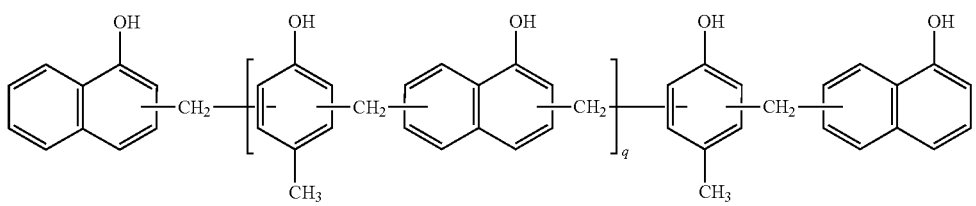

A phenolic resin (g) is a mixture having the following formula in which r is 0 to 10.

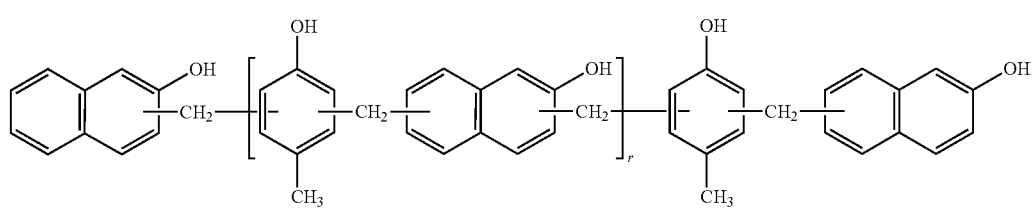

A phenolic resin (h) is a novolac type phenolic resin TD-2131 (Dainippon Ink & Chemicals, Inc.)
Inorganic Filler
Spherical fused silica by Tatsumori K.K.

| Flame retardant | |
|---|---|
| Flame retardant (j): | phosphazene compound of Synthesis Example A |
| Flame retardant (k): | phosphazene compound of Synthesis Example B |
| Flame retardant (l): | magnesium hydroxide KISMA 8N by Kyowa Chemical Co., Ltd. |
| Other additives | |
| Cure accelerator: | triphenylphosphine (Hokko Chemical Co., Ltd.) |
| Parting agent: | Carnauba Wax (Nikko Fine Products Co., Ltd.) |
| Silane coupling agent: | γ-glycidoxypropyltrimethoxysilane KBM-403 (Shin-Etsu Chemical Co., Ltd.) |

Properties (i) to (viii) of the compositions were measured by the following methods. The results are shown in Table 2.
(i) Spiral Flow
Measured by molding at 175° C. and 6.9 N/mm² for a molding time of 120 seconds using a mold in accordance with EMMI standards.
(ii) Melt Viscosity
Viscosity was measured at a temperature of 175° C. and a pressure of 10 kgf by an extrusion plastometer through a nozzle having a diameter of 1 mm.
(iii) Glass Transition Temperature (Tg) and Coefficient of Linear Expansion (CE)
Measured by molding at 175° C. and 6.9 N/mm² for a molding time of 120 seconds using a mold in accordance with EMMI standards.
(iv) Moisture Absorption
The composition was molded at 175° C. and 6.9 N/mm² for 2 minutes into a disc of 50 mm diameter and 3 mm thick and post-cured at 180° C. for 4 hours. The disc was held in a temperature/moisture controlled chamber at 85° C. and 85% RH for 168 hours, following which a percent moisture absorption was determined.
(v) Warpage
A silicon chip of 10×10×0.3 mm was mounted on a bismaleimide triazine (BT) resin substrate of 0.40 mm thick. The composition was transfer molded at 175° C. and 6.9 N/mm² for 2 minutes and post-cured at 175° C. for 5 hours, completing a package of 32×32×1.2 mm. Using a laser three-dimensional tester, the height of the package was measured in a diagonal direction to determine changes, the maximum change being a warpage.
(vi) Reflow Resistance
The package used in the warpage measurement was held in a temperature/moisture controlled chamber at 85° C. and 60% RH for 168 hours for moisture absorption. Using an IR reflow apparatus, the package was subjected to three cycles of IR reflow under the conditions shown in FIG. 1. Using a ultrasonic flaw detector, the package was inspected for internal cracks and delamination.
(vii) Flame Retardance
The composition was molded at 175° C. and 6.9 N/mm² for 120 seconds and post cured at 180° C. for 4 hours to form a plate of 1/16 inch thick, which was tested in accordance with UL-94 (Underwriter's Laboratory Bulletin 94 entitled "Tests for Flammability of Plastic Materials, UL-94").
(viii) Moisture-Proof Reliability
A silicon chip of 6×6 mm having aluminum strips of 5 μm wide formed thereon at intervals of 5 μm was attached to a 14-pin DIP frame (42 Alloy). Aluminum electrodes on the chip surface were bonded to the lead frame by gold wires of 25 μm diameter. The epoxy resin composition was molded thereon at 175° C. and 6.9 N/mm² for 120 seconds and post-cured at 180° C. for 4 hours, completing a package. Twenty packages were held in an atmosphere of 130° C. and 85% RH for 500 hours while a DC bias voltage of −20 volts was applied thereacross. The number of packages in which aluminum corrosion was observed was reported per the total number of test packages.

TABLE 2

| | | Amount of component (parts by weight) | | | | | | | | | | |
|---|---|---|---|---|---|---|---|---|---|---|---|---|
| | | Example | | | | | | Comparative Example | | | | |
| | | 1 | 2 | 3 | 4 | 5 | 6 | 7 | 8 | 9 | 10 | 11 |
| Epoxy resin | (a) | 59 | 59 | 48 | 62 | 63 | | | | | | 6.5 |
| | (b) | | | | | | 59 | | | | | |
| | (c) | | | | | | | 60 | 60 | | | |
| | (d) | | | | | | | | | 57 | | |
| | (e) | | | 12 | | | | | | | 66 | |
| Phenolic resin | (f) | 41 | | 40 | 19 | 11 | 41.0 | 40 | 40 | 43 | 34 | |
| | (g) | | 41 | | | | | | | | | |
| | (h) | | | | 19 | 26 | | | | | | 35 |
| Inorganic filler | | 600 | 600 | 600 | 600 | 600 | 600 | 600 | 600 | 600 | 600 | 600 |
| Flame retardant | (j) | 6 | | 5 | 8 | | | | | | | |
| | (k) | | 10 | | | 8 | 15 | | | | | |
| | (l) | | | | | | | | 50 | | | |
| Cure accelerator | | 1.5 | 1.5 | 1.5 | 1.5 | 1.5 | 1.5 | 1.5 | 1.5 | 1.5 | 1.5 | 1.5 |
| Parting agent | | 1 | 1 | 1 | 1 | 1 | 1 | 1 | 1 | 1 | 1 | 1 |
| Coupling agent | | 1 | 1 | 1 | 1 | 1 | 1 | 1 | 1 | 1 | 1 | 1 |
| Spiral flow, cm | | 130 | 140 | 128 | 129 | 125 | 126 | 145 | 80 | 105 | 120 | 120 |
| Melt viscosity, Pa·s | | 7 | 6 | 8 | 8 | 8 | 8 | 5 | 25 | 12 | 11 | 10 |
| Tg, °C. | | 153 | 150 | 144 | 147 | 142 | 155 | 133 | 133 | 160 | 132 | 140 |
| CE, ppm | | 8 | 7 | 8 | 8 | 8 | 7 | 9 | 8 | 7 | 11 | 12 |
| Moisture absorption, % | | 0.15 | 0.16 | 0.16 | 0.16 | 0.19 | 0.17 | 0.18 | 0.17 | 0.2 | 0.18 | 0.27 |
| Warpage, μm | | 28 | 35 | 38 | 45 | 56 | 22 | 120 | 110 | 20 | 250 | 230 |
| Reflow resistance | crack defective samples/test samples | 0/20 | 0/20 | 0/20 | 0/20 | 0/20 | 0/20 | 0/20 | 8/20 | 4/20 | 0/20 | 8/20 |
| | delamination defective samples/test samples | 0/20 | 0/20 | 0/20 | 0/20 | 0/20 | 0/20 | 0/20 | 12/20 | 9/20 | 0/20 | 15/20 |
| Flame retardance: UL-94 | | V-0 | V-0 | V-0 | V-0 | V-0 | V-0 | burn down | V-0 | burn down | burn down | burn down |

TABLE 2-continued

| | | Example | | | | | | Comparative Example | | | | |
|---|---|---|---|---|---|---|---|---|---|---|---|---|
| | | 1 | 2 | 3 | 4 | 5 | 6 | 7 | 8 | 9 | 10 | 11 |
| Moisture-proof reliability | defective samples/ test samples | 0/20 | 0/20 | 0/20 | 0/20 | 0/20 | 0/20 | 20/20 | 20/20 | 20/20 | 11/20 | 5/20 |

Japanese Patent Application No. 2005-125950 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An epoxy resin composition used for encapsulation of a semiconductor device comprising a resin substrate or a metal substrate, and a semiconductor member mounted solely on one surface of the resin substrate or one surface of the metal substrate,
wherein the semiconductor member is encapsulated with a cured product of an epoxy resin composition solely on the one surface of the resin substrate or metal substrate, said composition comprising
(A) a naphthalene ring-containing epoxy resin having the general formula (1):

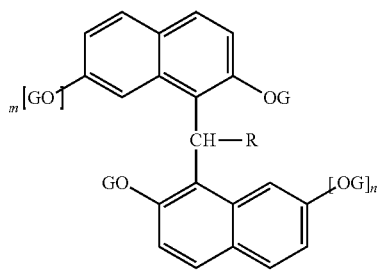

(1)

wherein m and n are 0 or 1, R is hydrogen, $C_1$-$C_4$ alkyl or phenyl, and G is a glycidyl-containing organic group, wherein 35 to 85 parts by weight of the resin wherein m=0 and n=0 and 1 to 35 parts by weight of the resin wherein m=1 and n=1 are included per 100 parts by weight of the resin of formula (1), (B) a phenolic resin curing agent comprising a phenolic resin having the general formula (3):

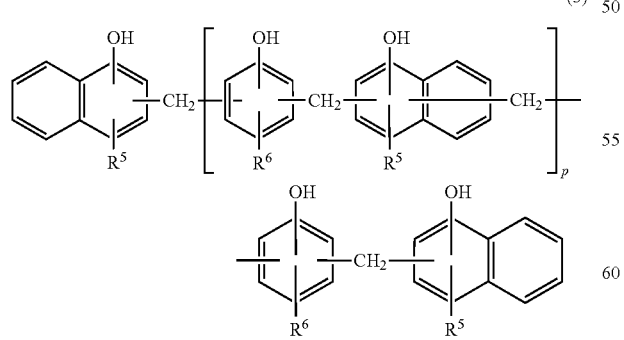

(3)

wherein $R^5$ and $R^6$ are each independently hydrogen, $C_1$-$C_4$ alkyl or aryl, and p is an integer of 0 to 10 and wherein the phenolic resin of formula (3) constitutes 25 to 100 weight-% of phenolic resin curing agent component (B), wherein said phenolic resin curing agent is present in an amount such that the molar ratio of phenolic hydroxyl groups therein to epoxy groups in the epoxy resin (A) is from 0.5 to 1.5, (C) an inorganic filler in an amount of 200 to 1100 parts by weight per 100 parts by weight of epoxy resin (A) and curing agent (B) combined, and (D) a phosphazene compound having the average compositional formula (2):

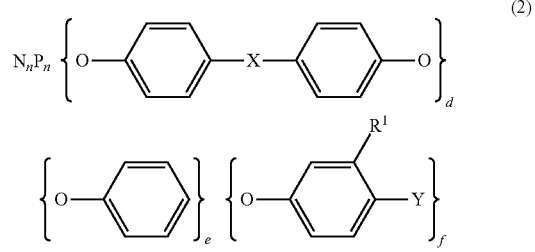

(2)

wherein X is a single bond or a group selected from among $CH_2$, $C(CH_3)_2$, $SO_2$, S, O, and $O(CO)O$; Y is OH, SH or $NH_2$; $R^1$ is a group selected from among $C_1$-$C_4$ alkyl and alkoxy, $NH_2$, $NR^2R^3$, and $SR^4$; $R^2$, $R^3$ and $R^4$ each are hydrogen or $C_1$-$C_4$ alkyl; d, e, f and n are numbers satisfying $0 \leq d \leq 0.25n$, $0 \leq e \leq 2n$, $0 \leq f \leq 2n$, $2d+e+f=2n$, and $3 \leq n \leq 1,000$ in an amount of 1 to 50% by weight based on the total weight of components (A) and (B).

2. The epoxy resin composition of claim 1, wherein the naphthalene ring-containing epoxy resin is a mixture of the following epoxy resins (i), (ii) and (iii):

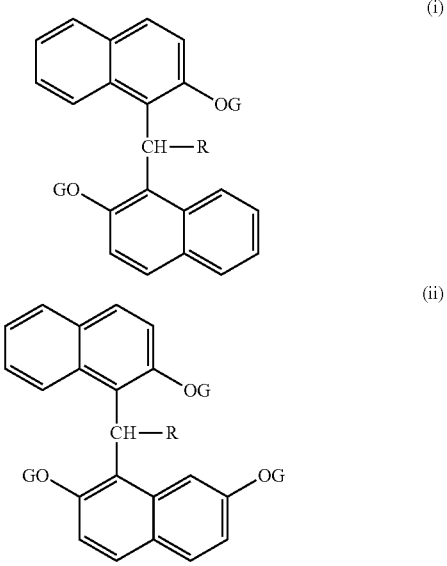

wherein R is hydrogen, $C_1$-$C_4$ alkyl, or phenyl, and G is a glycidyl-containing organic group, with the proviso that 45 to 70 parts by weight of the epoxy resin (i), 5 to 30 parts by weight of the epoxy resin (iii), and the residue of the epoxy resin (ii) are included per 100 parts by weight of the mixture.

3. The epoxy resin composition of claim 2, wherein the epoxy resin (iii) is present in an amount of 5 to 15 parts by weight per 100 parts by weight of the mixture.

4. A semiconductor device comprising a resin substrate or a metal substrate and a semiconductor member mounted solely on one surface of the resin substrate or on one surface of the meal substrate, wherein the semiconductor member is encapsulated with a cured product of an epoxy resin composition solely on the one surface of the resin substrate or metal substrate, said epoxy resin composition comprising (A) a naphthalene ring-containing epoxy resin having the general formula (1):

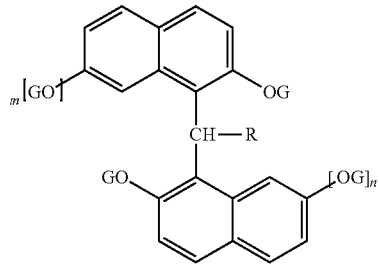

(1)

wherein m and n are 0 or 1, R is hydrogen, $C_1$-$C_4$ alkyl or phenyl, and G is a glycidyl-containing organic group, wherein 35 to 85 parts by weight of the resin wherein m=0 and n=0 and 1 to 35 parts by weight of the resin wherein m=1 and n=1 are included per 100 parts by weight of the resin of formula (1), (B) a phenolic resin curing agent comprising a phenolic resin having the general formula (3):

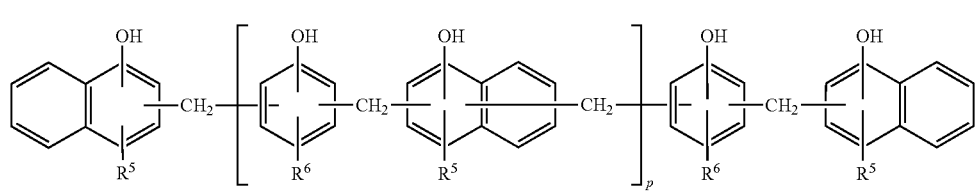

(3)

wherein $R^5$ and $R^6$ are each independently hydrogen, $C_1$-$C_4$ alkyl or aryl, and p is an integer of 0 to 10 and wherein the phenolic resin of formula (3) constitutes 25 to 100 weight-% of phenolic resin curing agent component (B), wherein said phenolic resin curing agent is present in an amount such that the molar ratio of phenolic hydroxyl groups therein to epoxy groups in the epoxy resin (A) is from 0.5 to 1.5, (C) an inorganic filler in an amount of 200 to 1100 parts by weight per 100 parts by weight of epoxy resin (A) and curing agent (B) combined, and (D) a phosphazene compound having the average compositional formula (2):

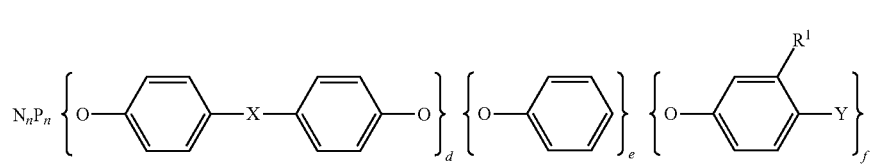

(2)

wherein X is a single bond or a group selected from among $CH_2$, $C(CH_3)_2$, $SO_2$, S, O, and $O(CO)O$; Y is OH, SH or $NH_2$; $R^1$ is a group selected from among $C_1$-$C_4$ alkyl and alkoxy, $NH_2$, $NR^2R^3$, and $SR^4$; $R^2$, $R^3$ and $R^4$ each are hydrogen or $C_1$-$C_4$ alkyl; d, e, f and n are numbers satisfying $0 \leq d \leq 0.25n$, $0 \leq e \leq 2n$, $0 \leq f \leq 2n$, $2d+e+f=2n$, and $3 \leq n \leq 1,000$ in an amount of 1 to 50% by weight based on the total weight of components (A) and (B), whereby the semiconductor device in which the semiconductor member is mounted and encapsulated with the cured product of the epoxy resin composition solely on the one surface of the substrate has improved resistance to warpage.

5. The semiconductor device of claim 4, wherein the naphthalene ring-containing epoxy resin is a mixture of the following epoxy resin (i), (ii) and (iii):

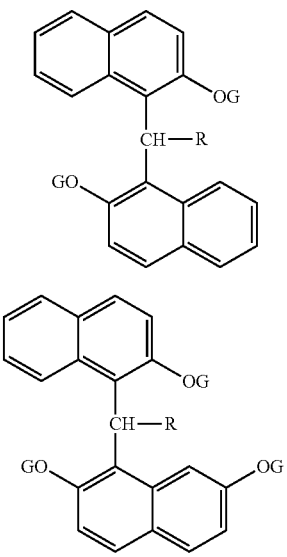

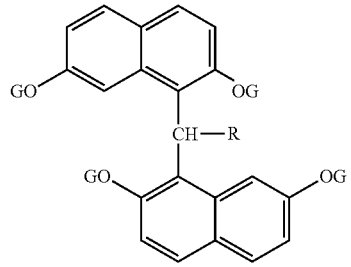

wherein R is hydrogen, $C_1$-$C_4$ alkyl, or phenyl, and G is a glycidyl-containing organic group, with the proviso that 45 to 70 parts by weight of the epoxy resin (i), 5 to 30 parts by weight of the epoxy resin (iii) and the residue of the epoxy resin (ii) are included per 100 parts by weight of the mixture.

6. The semiconductor device of claim 5, wherein the epoxy resin (iii) is present in an amount of 5 to 15 parts by weight per 100 parts by weight of the mixture.

* * * * *